United States Patent
Haroun et al.

(10) Patent No.: US 9,943,776 B2
(45) Date of Patent: Apr. 17, 2018

(54) COMPACT DISTRIBUTOR TRAY FOR OFFSHORE GAS/LIQUID CONTACT COLUMNS

(71) Applicant: IFP ENERGIES NOUVELLES, Rueil-Malmaison (FR)

(72) Inventors: Yacine Haroun, Etats-Unis (FR); Pascal Alix, Roussillon (FR); Manel Fourati, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 54 days.

(21) Appl. No.: 14/857,920

(22) Filed: Sep. 18, 2015

(65) Prior Publication Data

US 2016/0082364 A1 Mar. 24, 2016

(30) Foreign Application Priority Data

Sep. 24, 2014 (FR) ..................................... 14 59001

(51) Int. Cl.
| | |
|---|---|
| *B01F 3/04* | (2006.01) |
| *B01D 3/32* | (2006.01) |
| *B01D 53/18* | (2006.01) |
| *B63B 35/44* | (2006.01) |
| *B01D 3/00* | (2006.01) |

(52) U.S. Cl.
CPC ............ *B01D 3/324* (2013.01); *B01D 3/008* (2013.01); *B01D 53/185* (2013.01); *B01F 3/04078* (2013.01); *B01F 3/04468* (2013.01); *B01F 3/04496* (2013.01); *B63B 35/44* (2013.01)

(58) Field of Classification Search
CPC ...... B01D 3/008; B01D 3/324; B01D 53/185; B01F 3/04078; B01F 3/04468; B01F 3/04496; B63B 35/44
USPC ................................ 261/113, 114.5, 97, 110
See application file for complete search history.

(56) References Cited

U.S. PATENT DOCUMENTS

| | | | | | |
|---|---|---|---|---|---|
| 1,738,870 | A | * | 12/1929 | Cox ......................... | B01D 3/22 |
| | | | | | 261/113 |
| 1,748,409 | A | * | 2/1930 | Campbell .............. | B01D 53/18 |
| | | | | | 202/158 |

(Continued)

FOREIGN PATENT DOCUMENTS

| | | |
|---|---|---|
| EP | 263203 A1 | 10/2013 |
| FR | 298019 A1 | 4/2013 |
| FR | 2989595 A1 | 10/2013 |

OTHER PUBLICATIONS

Search Report for French Application No. FR 1459001 dated May 13, 2015.

*Primary Examiner* — Charles Bushey
(74) *Attorney, Agent, or Firm* — Fitch Even Tabin & Flannery LLP

(57) ABSTRACT

The invention is a distributor tray having at least one perforated wall defining compartments. The distributor tray has at least one distribution compartment through which gas and the liquid flows through the tray, and at least one retention compartment through which the liquid cannot flow through the tray. The at least one retention compartment is on the periphery of the tray. The invention also relates to a column for heat and/or material exchange between a gas and a liquid equipped with a distributor tray, to a floating barge including the column and to the use of the column.

28 Claims, 4 Drawing Sheets

(56) References Cited

U.S. PATENT DOCUMENTS

| | | | | |
|---|---|---|---|---|
| 2,545,691 | A * | 3/1951 | Gerhold | B01D 3/18 261/114.1 |
| 2,926,754 | A * | 3/1960 | Ragatz | B01D 3/22 202/158 |
| 3,759,498 | A * | 9/1973 | Matsch | B01D 3/22 261/114.3 |
| 4,820,456 | A * | 4/1989 | Kiselev | B01D 3/22 261/111 |
| 6,395,138 | B1 * | 5/2002 | Darredeau | B01D 3/008 196/111 |
| 7,182,922 | B2 * | 2/2007 | Boyer | B01F 3/04496 208/210 |
| 9,120,064 | B2 * | 9/2015 | Horoun | B01F 3/04496 |
| 2004/0020238 | A1 * | 2/2004 | Kalbassi | B01D 19/0047 62/617 |
| 2004/0197245 | A1 | 10/2004 | Boyer | |
| 2005/0062178 | A1 * | 3/2005 | Harter | B01D 3/008 261/96 |
| 2013/0277868 | A1 * | 10/2013 | Haroun | B01D 53/185 261/113 |
| 2013/0277869 | A1 * | 10/2013 | Haroun | B01F 3/04496 261/114.5 |

* cited by examiner

# COMPACT DISTRIBUTOR TRAY FOR OFFSHORE GAS/LIQUID CONTACT COLUMNS

CROSS REFERENCE TO RELATED APPLICATION

Reference is made to French Patent Application No. 14/59.001, filed Sep. 24, 2014, which application is incorporated herein by reference in its entirety.

BACKGROUND OF THE INVENTION

Field of the Invention

The present invention relates to the field of offshore gas/liquid contact columns, and more particularly to offshore gas treatment, $CO_2$ capture, dehydration or distillation units.

Offshore gas treatment and/or $CO_2$ capture units using amine wash processes comprise liquid or gaseous fluid absorption and regeneration columns. These columns operate under counter-current or co-current gas/liquid flow conditions and they are installed on vessels, floating barges or offshore platforms, of FPSO (Floating Production, Storage and Offloading) or FLNG (Floating Liquefied Natural Gas) type for example. Distillation columns or dehydration columns can also be installed on floating barges.

The columns used in these offshore gas treatment and/or $CO_2$ capture and/or distillation and/or dehydration units are generally based on the principle of a material and/or heat exchange between the gas and the fluid that circulate in the columns. FIG. 1 shows a particular case of a gas treatment column 1 equipped with a distributor tray at the column top. Conventionally, this gas treatment column 1 comprises several sections filled by a contactor 3, and a distributor tray 2 is arranged above each section 3. The gas/liquid contactor contacts gas G with liquid L so as to allow exchanges.

The standard prior art distributors 2 used in absorption/regeneration or distillation columns generally consist of a collector/distributor tray equipped with chimneys 4 (see FIG. 2). Distribution of the liquid occurs through passages thereof in orifices 5 positioned in the lower part of tray 2 and distribution of the gas occurs through chimneys 4. Each chimney 4 allows passage of the gas, according to the counter-current or co-current operating mode, from the lower part of the column to the upper part of column 1, or from the upper part to the lower part. Chimneys 4 project beyond one side of tray 2 and they are perpendicular thereto. Each chimney 4 consists of several walls, parallelepipedic or cylindrical for example, which delimit an inner volume that is open on either side of tray 2. In order to prevent the liquid from passing through chimneys 4, the gas outlet or inlet opening above the tray (according to the counter-current or co-current mode) is preferably orthogonal to the longitudinal direction of chimney 4. The purpose of the distributor tray is to distribute liquid L homogeneously onto gas/liquid contactor 3.

The trays which are equipped with chimneys can be of different types and the chimneys can be positioned according to different configurations. Different distributor tray variants are described notably in the following patent applications and patents: U.S. Pat. No. 6,338,774 B, US-2,004,020,238 A, U.S. Pat. No. 6,149,136 A and U.S. Pat. No. 5,752,538 A.

The gas/liquid contact columns considered are placed on floating structures, of vessel, platform or barge type for example, sensitive to wave motion. The equipments installed on these units, notably gas/liquid distributor trays, therefore undergo wave motions up to six degrees of freedom ("yaw, pitch, roll, heave, sway, thrust").

By way of example, the angle associated with the combination of the pitch and roll oscillations is of the order of +/−5° with a period from 10 to 20 s. The orders of magnitude of the longitudinal, transverse and vertical accelerations encountered in the column are of the order of 0.33/1.28/0.33 m/s$^2$ respectively 50 m above the deck.

Under such conditions, the operation of conventional distributor trays equipped with chimneys (FIG. 2) can be greatly disturbed. Indeed, the operation of these distributors is mainly based on gravity, and a liquid guard level of homogeneous height "h" has to form on the distributor tray. The square of the velocity of flow of the liquid through orifices 5 in the lower part of tray 2 is proportional to the height of the liquid guard level ($U_L^2 \propto gh$). When prior art tray 2 is inclined under the effect of the wave motion (FIG. 3), the height of the liquid level is no longer uniform on the distributor tray ($h_1 > h_2$), which causes an imbalance in the distribution of liquid at the inlet of gas/liquid contactor 3. The distribution quality and thus the efficiency of the column are greatly impacted. This poor distribution, if it is not controlled, can substantially degrade the performances of the column. A great liquid guard height would be necessary to make up for these effects, which means a bulk and weight increase that is not suitable for offshore units.

In order to avoid this type of problem, distribution elements hardly sensitive to horizontal variability have been used. These distributors generally consist of a collector and a distributor connected by one or more relatively long vertical lines so that the distributor remains under charge whatever the wave motion conditions encountered. These distributors are generally little sensitive to the effects of the wave motion and they generate a good distribution quality, but they are very bulky: they can be several meters high in some cases (US-2,004,020,238 A).

Another solution to these problems is described in patents FR-2,771,018 A and FR-2,771,019 A; it consists in using two distributors (primary and secondary). Each distributor is divided into several compartments in which the liquid spreads. These compartments allow the liquid to be better distributed in case of inclination of the column. However, this option remains cumbersome because it requires two distributors. Besides, the compartments do not communicate with one another, so that the liquid is not evenly distributed in the compartments.

U.S. Pat. No. 5,132,055 discloses a distributor tray wherein the chimneys allow the liquid flow zone to be partitioned. According to this document, the chimneys are all parallel. The compartments therefore all have a different surface area. Besides, the parallel arrangement of the chimneys does not allow to ensure good liquid supply and distribution over the entire tray. Indeed, when the inclination of the tray is parallel to these chimneys, the liquid guard level varies significantly between the two ends of the tray.

French patent application 2,989,585, corresponding to US Published Application No. 2013/277,868, describes a distributor tray comprising perforated walls that defines compartments. The perforated walls allow the poor liquid distribution to be limited.

SUMMARY OF THE INVENTION

The invention relates to a distributor tray comprising at least one perforated wall defining compartments. The distributor tray comprises at least one distribution compartment within which the gas and the liquid can flow through the tray, and at least one retention compartment within which the liquid cannot flow through the tray. The at least one retention compartment is arranged on the periphery of the tray. The presence of at least one retention compartment on the periphery of the tray provides good liquid distribution quality and good dispersion of the liquid, even in case of the distributor tray being greatly inclined by the marine environment.

The invention relates to a distributor tray for a column intended for heat and/or material exchange between a gas and a liquid, comprising at least one wall defining compartments on the upper face of the tray, the wall comprising perforations allowing part of the liquid to flow between the compartments, said tray comprising at least one distribution compartment including at least one means allowing passage of the liquid through the tray and at least one means allowing passage of the gas through the tray. The tray comprises at least one retention compartment on the periphery of the tray which does not allow passage of the liquid through said tray.

According to the invention, the at least one retention compartment does not allow passage of the gas through said tray.

Advantageously, each compartment on the periphery of the tray is a retention compartment.

Preferably, the means allowing passage of the gas are gas distribution elements in the form of chimneys projecting upward from the upper face of tray.

According to a variant embodiment, the height of the wall is greater than or substantially equal to the height of the chimneys.

According to a feature of the invention, the perforations are arranged at the base of the wall.

According to an aspect of the invention, the tray comprises several non parallel walls.

Advantageously, the walls have two series of walls with the walls of each series being parallel to one another and not parallel to the walls of the other series.

Furthermore, the perforations of two parallel walls defining the same compartment may not be aligned.

Advantageously, dimensions $L_{c1}$ and $L_{c2}$ of the distribution compartment range between 100 and 1000 mm.

Preferably, dimensions $L_{c3}$ of said retention compartment range between 40 and 200 mm.

According to an embodiment of the invention, the liquid passage means are orifices and/or chimneys projecting from the upper face of the tray.

According to a variant embodiment of the invention, the tray comprises a secondary distribution system projecting from the lower face of the tray for distributing the liquid coming from the liquid passage means.

The secondary distribution system can comprise chimneys and/or deflectors.

Furthermore, the invention relates to a column intended for heat and/or material exchange between a gas and a liquid, wherein the two fluids are contacted by means of a packing. The column comprises at least one distributor tray according to the invention for distributing the fluids on the packing.

The invention also relates to a floating barge, notably for hydrocarbon recovery, which comprises at least one column according to the invention.

The invention furthermore relates to the use of a column according to the invention for a gas treatment, $CO_2$ capture, distillation or an air conversion process.

BRIEF DESCRIPTION OF THE FIGURES

Other features and advantages of the method according to the invention will be clear from reading the description hereafter of embodiments given by way of non-limitative example, with reference to the accompanying figures wherein.

DETAILED DESCRIPTION

Figure 4:
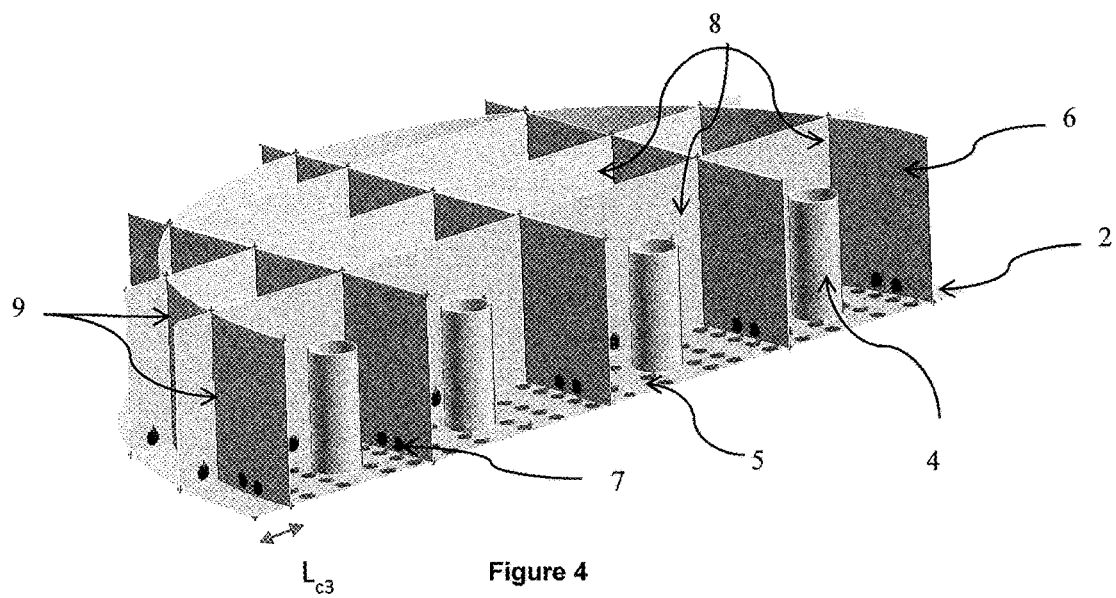
FIG. 4 illustrates a partial view of a distributor tray according to the invention.

FIG. 4 illustrates a distributor tray according to the invention which is an isometric view of a tray cut along a diameter of the tray. The other part of the tray is deduced by symmetry, with a wall at the level of the cutting plane.

The invention relates to a distributor tray for a column intended for heat and/or material exchange between a gas and a liquid, conventionally comprising at least one means 4 (such as a chimney) allowing passage of the gas through tray 2, and at least one means 5 (such as an orifice) allowing passage of the liquid through tray 2.

Furthermore, the distributor tray comprises at least one wall 6 allowing a face of the tray to be partitioned. Wall 6 is perforated 7 to allow part of the liquid to flow between compartments 8 and 9 formed by wall 6. According to an embodiment of the invention, the distributor tray comprises several walls 6. Distributor tray 2 according to the invention comprises at least one distribution compartment 8 and at least one retention compartment 9.

Figure 6:
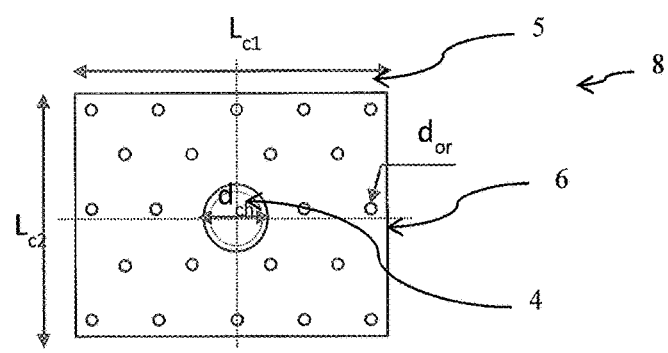
FIG. 6 illustrates a top view of a distribution compartment according to an embodiment of the invention.

Each distribution compartment 8 allows distribution of the fluids, and it comprises at least one gas passage means 4 and at least one, preferably more, liquid passage means 5. Preferably, each distribution compartment 8 comprises a single chimney 4 for gas passage and several orifices 5 for liquid passage. FIG. 6 shows an example of a top view of a distribution compartment 8. The illustrated distribution compartment comprises a central gas chimney 4 surrounded by a plurality of orifices 5 for liquid passage.

Each retention compartment 9 retains the liquid on the upper face (or surface) of the tray and it does not allow passage of the liquid through the tray. Also, retention compartment 9 preferably does not allow passage of the gas through the tray. Walls 6 of retention compartments 9 are also perforated. According to the invention, retention compartments are arranged on the periphery of tray 2. That is retention compartments 9 are made up of walls 6 and the shell of column 1. According to an embodiment, an additional wall could be provided on the shell periphery to facilitate setting of the distributor and provide good sealing between the retention compartments. According to an aspect of the invention, all the compartments on the periphery of tray 2 are retention compartments 9 and the other compartments, i.e. the central compartments (not defined by the shell of column 1), are distribution compartments 8.

Walls 6 form liquid compartments 8 and 9 which serve as "barriers" when the tray is inclined. A relatively homogeneous liquid "guard" level is thus maintained even in case of great inclination. Thus, a good quality of liquid distribution on the gas/liquid contactor is guaranteed. What is referred to as the liquid guard is the interface between the gas and the liquid. The height of the liquid guard corresponds to the liquid level with respect to the upper surface of the tray. Furthermore, what is referred to as liquid flow zone is the zone on which the liquid circulates which is the upper side of the tray from which walls 6 project. Furthermore, perforations 7 in walls 6 allow the liquid to flow over the entire face of distributor tray 2, thus providing good radial dispersion of the liquid. Retention compartments 9 allow the liquid accumulation and attenuate a decrease in liquid level upon oscillations and good liquid distribution quality is thus provided.

Figure 5:
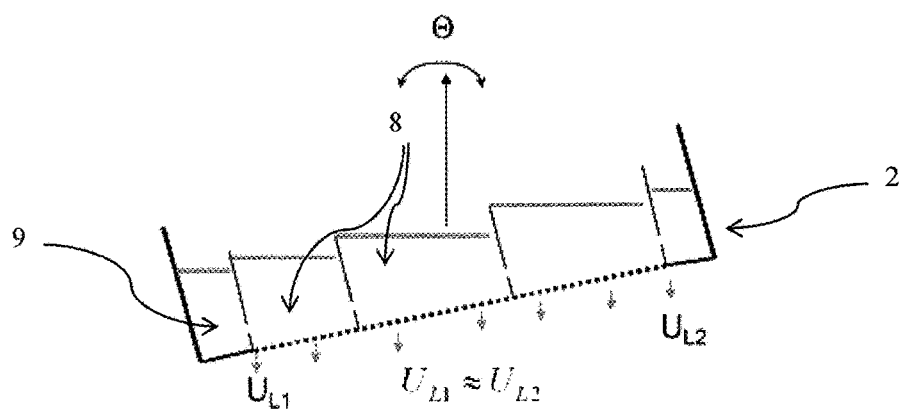
FIG. 5 illustrates an inclined distributor tray according to the invention.

FIG. 5 illustrates a distributor tray according to the invention in an inclined position. Distributor tray 2 comprises on each side of the periphery a retention compartment 9. The central compartments are distribution compartments 8. By comparison with FIG. 3, the liquid guard height varies less and therefore the liquid outlet velocities $U_{L1}$ and $U_{L2}$ do not substantially differ. The distribution is therefore more homogeneous than with the distributor tray according to the prior art.

According to an embodiment of the invention, the gas passage means are chimneys 4. According to a feature of the invention, the chimneys can be cylindrical, cubic, parallelepipedic, or they can have any other similar shape. Furthermore, the pitch of the chimneys on the tray can be triangular or square.

According to an aspect of the invention, the liquid passage means are orifices 5 provided on tray 2. Orifices 5 can have a triangular or square pitch. Advantageously, the number of orifices 5 of tray 2 is larger than the number of chimneys 4. Moreover, the orifices 5 can have identical or different sizes.

According to the embodiment of the invention illustrated in FIG. 4, the walls are distributed into two series (or sets) of walls. In each series, the walls are parallel to one another, evenly spaced out by a length $L_{c1}$ and inclined to intersect the walls of the other series that are evenly spaced out by a length $L_{c2}$. Thus, distribution compartments 8 substantially have the shape of a parallelogram and, according to the illustrated example are rectangular in shape. Advantageously, according to this embodiment, the height of walls 6 is greater than, smaller than or substantially equal to the height of chimneys 4. This height is sufficient to provide good distribution quality and, in addition, the space requirement of the distributor tray according to the invention remains identical to that of a "conventional" distributor tray. Each distribution compartment 8 comprises a single chimney 4. According to this embodiment, a spacing $L_{c1}$ and $L_{c2}$ substantially equal to the distance between two neighboring chimneys can be selected.

Advantageously, the surface area of retention compartments 9 is smaller than the surface area of distribution compartments 8 in order to guarantee a large distribution surface area. Length $L_{c3}$, which corresponds to the length of the inclined walls on the tray edge, can notably be smaller than length $L_{c1}$ (see FIG. 6).

Figure 1:
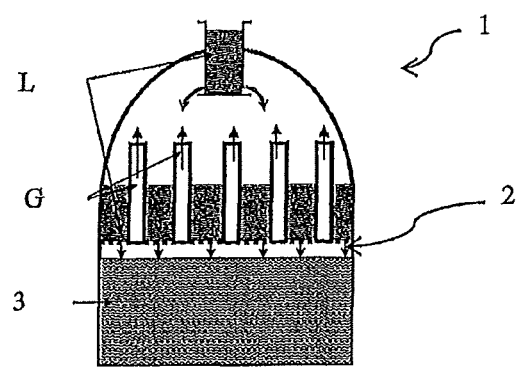
FIG. 1, already described, illustrates the particular case of a gas treatment or $CO_2$ capture column equipped with a distributor tray at the column top.
Figure 2:
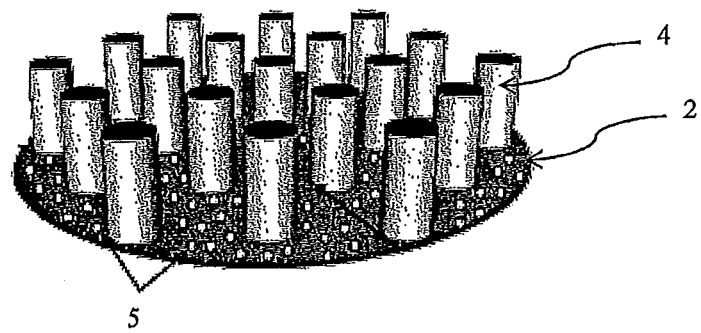
FIG. 2, already described, illustrates a distributor tray according to the prior art.
Figure 3:
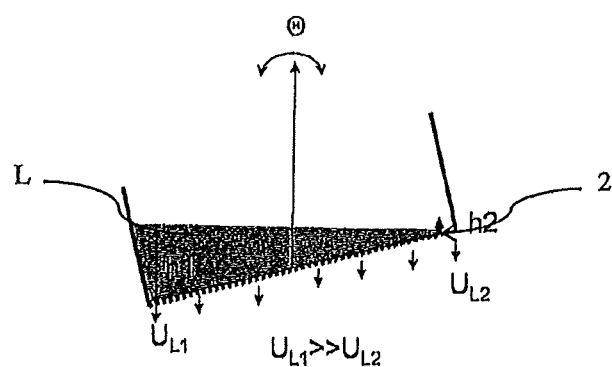
FIG. 3, already described, illustrates an inclined distributor tray according to the prior art.

It is also possible to determine length $L_{c1}$ and/or length La as a function of desired tray characteristics which are an imbalance index IQ (expressed in percentage) and a maximum inclination angle $\theta$ imposed by the marine conditions. To quantify the sensitivity of the tray to the marine environment, liquid imbalance index IQ is defined as follows:

$$IQ(\%) = \frac{q_{L,max} - q_{L,min}}{q_{L,moyen}} \times 100 \qquad \text{(Equation 1)}$$

with: $q_{L,max}$: being the maximum flow rate of liquid flowing from one of the distributor compartments, $q_{L,min}$ being the minimum flow rate of liquid flowing from one of the distributor compartments and $q_{L,moyen}$ being the average flow rate of liquid flowing from the distributor. These flow rates depend on $U_{L1,2}$: which is the velocity of the liquid flowing from the orifices arranged at the ends of the distributor tray as shown in FIGS. 3 (prior art) and 5 (according to the invention). A low value of the liquid imbalance index indicates a low sensitivity of the distribution to the effects of the wave motion. On the other hand, a high IQ index value indicates a great distribution imbalance.

The characteristic distances $L_{c1}$, $L_{c2}$ of the tray have to be optimized to minimize the imbalance index. Depending on the characteristics of the tray and on the operating conditions (maximum inclination angle $\theta$ imposed by the marine environment), it is possible to define an optimum length for $L_{c1}$ and $L_{c2}$ with the combination of the following formulations:

$$\begin{cases} h_{max} = h_0 + L_{C1,2} \tan\theta \\ h_{min} = h_0 - L_{C1,2} \tan\theta \\ \Delta h = h_{max} - h_{min} = 2L_{C1,2} \tan\theta \\ U_{L1} \propto c_f \sqrt{2gh_{max}} \\ U_{L2} \propto c_f \sqrt{2gh_{min}} \end{cases}$$

with:
$c_f$ being the friction coefficient at the orifice,
$h_0$ being height at equilibrium ($\theta=0°$) of the liquid guard in a compartment of the distributor,
$h_{max}$ being maximum height of liquid guard in a compartment of the distributor,
$h_{min}$ being minimum height of liquid guard in a compartment of the distributor,
$U_{L1}$, $U_{L2}$ being velocity of the liquid at the orifice, and
the sign $\propto$ means proportional to.

It is thus possible to determine lengths $L_{c1}$, $L_{c2}$ as a function of the geometry of the tray and of the marine conditions so as to meet a given imbalance index. For example, in order to have an imbalance index IQ<10%, it is necessary to have $\Delta h \leq 50$ mm, therefore lengths $L_{c1}$, $L_{c2}$ must satisfy the relation as follows:

$$L_{C1,2} \leq \frac{50}{2\tan\theta} (\text{mm}).$$

According to an embodiment of the invention, each wall 6 contains a single perforation 7. Alternatively, and as illustrated in FIG. 4, each wall 6 comprises two perforations 7. These perforations allow the fluid to flow between compartments 8 and 9, which provides good radial distribution of the liquid over the entire distributor tray. Perforations 7 can be circular, oblong, rectangular, etc. However, the surface area of perforations 7 can preferably remain small in relation to the surface area of the walls so that walls 6 continue to fulfill their main function which is to limit the amount of fluid flowing on the tray in order to guarantee good homogeneity of the liquid height on the tray. Furthermore, according to this embodiment, in order to prevent linear fluid flow and to provide good radial dispersion of the liquid, perforations 7 of two parallel walls of a distribution compartment 8 are not aligned (or coaxial), that is, a line passing through the centers of perforation of two parallel walls is not parallel to one of the walls of compartment 8. Advantageously, perforations 7 are arranged in the lower part of walls 6, that is, close to the distributor tray, to facilitate the fluid flow so that perforations 7 always remain positioned below the liquid guard height.

The number of compartments (and therefore the number of walls) can depend on the diameter of the tray. Preferably, a tray of large size is more partitioned than a tray of smaller size.

In a variant of the preferred embodiment of the invention, the following features can be modified so that:
The walls can form compartments comprising several gas passage chimneys respectively;
The compartments can have a triangular shape and for this embodiment, there can be three series of walls with the walls of one series being parallel to one another and inclines to the walls of the other series;
The compartments have a hexagonal shape (of honeycomb type for example);
The perforations of two sides can face each other in a compartment are aligned; and
Each wall comprises several perforations.

Figure 7:
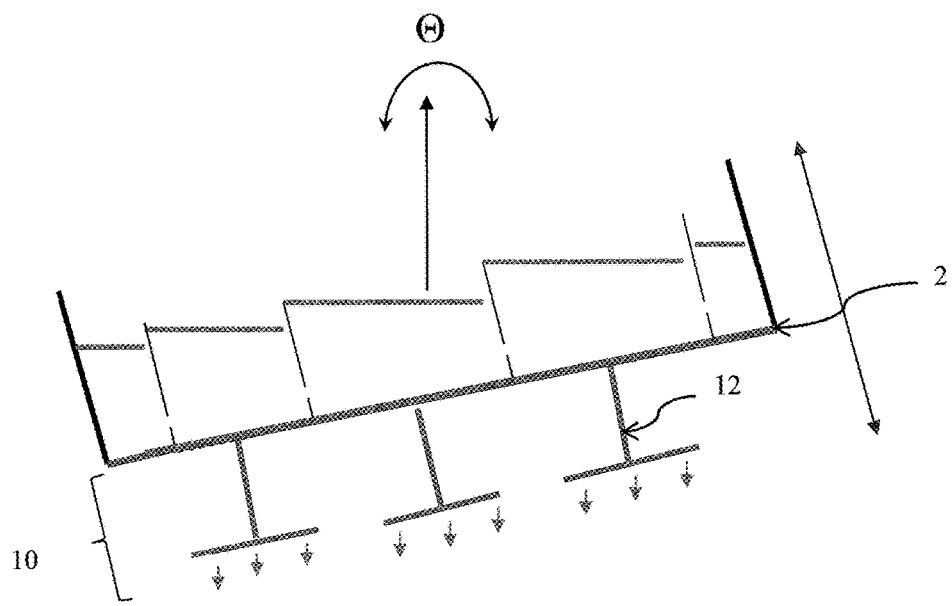
FIG. 7 illustrates a variant embodiment of the distributor tray according to the invention.

Furthermore, according to a variant illustrated in FIG. 7, distributor tray 2 can comprise a secondary distribution system 10 for the liquid. The secondary distribution system 10 projects from the lower face of the tray and distributes on the packing the liquid coming from the liquid passage means. The secondary distribution system 10 improves the liquid distribution quality by orienting the distribution of liquid on the packing. For example, secondary distribution system 10 can direct the liquid to the periphery of the packing below retention compartments 9. In this case, liquid guard height $H_{liq}$ corresponds to the height of liquid above tray 2 plus the height of secondary distribution system 10. As illustrated, secondary distribution system 10 can comprise deflectors 12 that orient the distribution of liquid. Alternatively, the secondary distribution system can comprise a set of sprinklers (an assembly of lines arranged in parallel and provided with orifices), chimneys projecting on the lower face of the distributor tray and/or a set of perforated lines arranged in parallel below the distributor tray.

Figure 8:
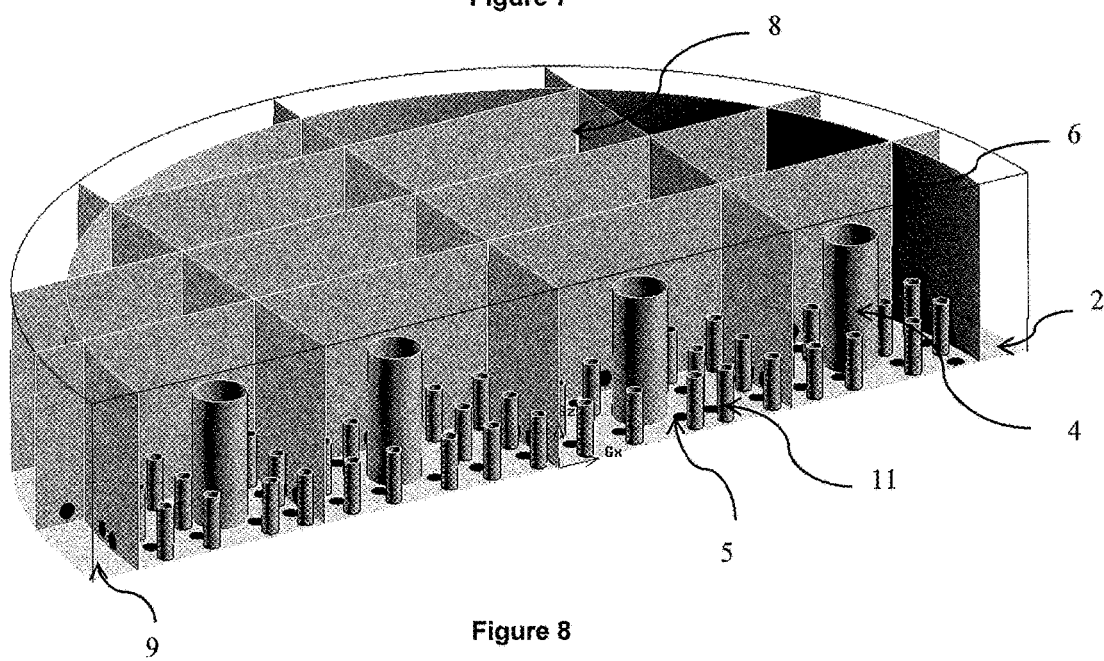
FIG. 8 illustrates a partial view of a distributor tray according to an embodiment of the invention.

Furthermore, according to a variant illustrated in FIG. 8, the liquid passage means comprise, in addition to orifices 5, liquid chimneys 11 equipped with at least one perforation (or at least one row of perforations) with the liquid chimneys 11 projecting from the upper face of the tray 2. This solution provides good flexibility of the distributor tray by being suited to various flow rates. Indeed, when the liquid flow rate is low, the liquid guard height in distributor compartment 8 on tray 2 (liquid height in relation to the level of the tray) is low, only orifices 5 allow the liquid to flow through the tray. When the liquid flow rate is higher, according to the embodiment, the liquid guard height increases and the radial orifices of liquid chimneys 11 allow the liquid to flow through the tray. The height of liquid passage chimneys 11 is advantageously lower than the height of gas passage chimneys 4.

Alternatively, to the variant of FIG. 8, the liquid passage means can comprise only liquid chimneys 11 that may have different heights and/or comprise perforations at different heights, so as to make the distributor tray flexible.

According to an embodiment, the dimensions of the tray and of its components match the following intervals:
the pitch P of chimneys 4 ranges between 50 and 500 mm, preferably between 100 and 300 mm;
the height of distributor tray 2 ranges between 100 and 2000 mm, preferably between 600 and 1000 mm;
the diameter of tray 2 ranges between 300 and 10,000 mm;
if elements 4 have a cylindrical shape, diameter $d_c$ ranges between 50 and 500 mm;
the height of chimneys 4 ranges between 300 and 2000 mm, preferably between 400 and 700 mm;
the minimum distance to the edge of chimneys 4 ranges between 50 and 400 mm and preferably between 100 and 200 mm;
the height of walls 6 ranges between 100 and 2000 mm and preferably between 700 and 1000 mm;
the diameter $d_{or}$ of perforations 7 ranges between 5 and 100 mm and preferably between 30 and 50 mm;
distances $L_{c1}$ and $L_{c2}$ of distribution compartments 8 range between 100 and 1000 mm, and they preferably satisfy the relation as follows:

$$L_{ci} \leq \frac{50}{2\tan\theta} (mm)$$

with i=1 or 2, with θ being the maximum inclination angle; and
the distance $L_{c3}$ of retention compartments 9 ranges between 40 and 200 mm.

These different variant embodiments of the distributor tray according to the invention can be combined. Notably the variants of FIGS. 7 and 8 as for example, chimneys 11 can be connected to deflectors 12.

The invention also relates to a column 1 intended for heat and/or material exchange between two fluids, wherein two fluids are contacted by means of a gas/liquid contactor 3, column 1 comprises at least a first inlet for a liquid fluid, at least a second inlet for a gaseous fluid, at least a first outlet for a gaseous fluid and at least a second outlet for a liquid fluid. Column 1 additionally comprises a distributor tray 2 as described above for distributing the fluids on contactor 3.

Advantageously, column 1 is an amine washing column but it is suited to any type of solvent.

Gas/liquid contactor 3 is advantageously a structured or random packed bed.

Furthermore, the invention relates to an offshore floating barge, notably of FPSO or FLNG type, notably for hydrocarbon production and processing. The barge comprises a column intended for material and/or heat exchange between a gas and a liquid as described above. The column can belong to a gas treatment and/or $CO_2$ capture unit for cleaning produced gases (or fumes).

The column according to the invention can be used in gas treatment, $CO_2$ capture, distillation or air conversion processes.

COMPARATIVE EXAMPLE

In order to illustrate the advantages of the present invention, comparison is made of the results obtained with the invention (embodiment of FIG. 4) and those obtained with a distributor tray according to the prior art as described in French patent application 2,989,595 corresponding to US Published Application No. 2013/277,868. A numerical approach of the CFD (Computational Fluid Dynamics) type is used that studies the motion of a fluid through the numerical solution of mass conservation and momentum balance equations (Navier-Stokes equations).

The numerical approach used is of interface tracking type (Volume of Fluid VOF) as described in Hirt & Nichols, JCP 39, 201-225 (1981). This method, which is well known, is suited for simulating the change in interface topology encountered in the distributor subjected to wave motion (detachment, interface reconnection, breaker formation, . . . ). The evolution of the two-phase flow is described by the mass conservation and momentum conservation equations, and by the presence rate transport equation.

Calculations were carried out with the commercial software Fluent 14.5® (ANSYS, USA).

For all the CFD evaluation calculations presented hereafter, the angle associated with the simulated roll motion is +/−5° with a 15 s period. The properties of the fluids are: $\rho_L$=1000 kg/m3, $\mu_L$=1 cp, $\rho_G$=1.2 kg/m3, $\mu_G$=0.018 cp. The liquid guard height on the distributor considered is 400 mm. A distance to the gyration point of the offshore platform of 50 m is taken into account in the calculations. This distance corresponds to the distributors arranged at the top of the column which is subjected to the highest accelerations. Finally, the capillary effects are assumed to be negligible.

It is to be noted that the distribution efficiency of the system provided is compared with that of a distributor tray according to the prior art in cases where the tray undergoes wave motions. The sensitivity of the tray to the marine environment is quantified by the imbalance index defined by Equation (1).

Example 1: Properties of the Tray According to the Prior Art

The diameter of the distributor tray is 4000 mm
diameter of the gas chimneys is 100 mm
height of the gas chimneys is 00 mm
number of chimneys is 120
length of compartments $L_{c1} \times L_{c2}$: 300×300 mm
wall aperture approximately 1%
sprinkling point density is 84 pt/m² (number of sprinkling points divided by the total surface area of the distributor)
sprinkling rate is 100 m³/m²/h.

Example 2: Properties of the Tray According to the Invention (FIG. 4)

diameter of the distributor tray is 4000 mm
diameter of the gas chimneys is 100 mm
height of the gas chimneys is 600 mm
number of chimneys is 120
length of distribution compartments $L_{c1} \times L_{c2}$: 300×300 mm
length of retention compartments $L_{c3}$: 100 mm
wall aperture is approximately 1%
sprinkling point density is 84 pt/m²
sprinkling rate is 100 m³/m²/h.

Figure 9:
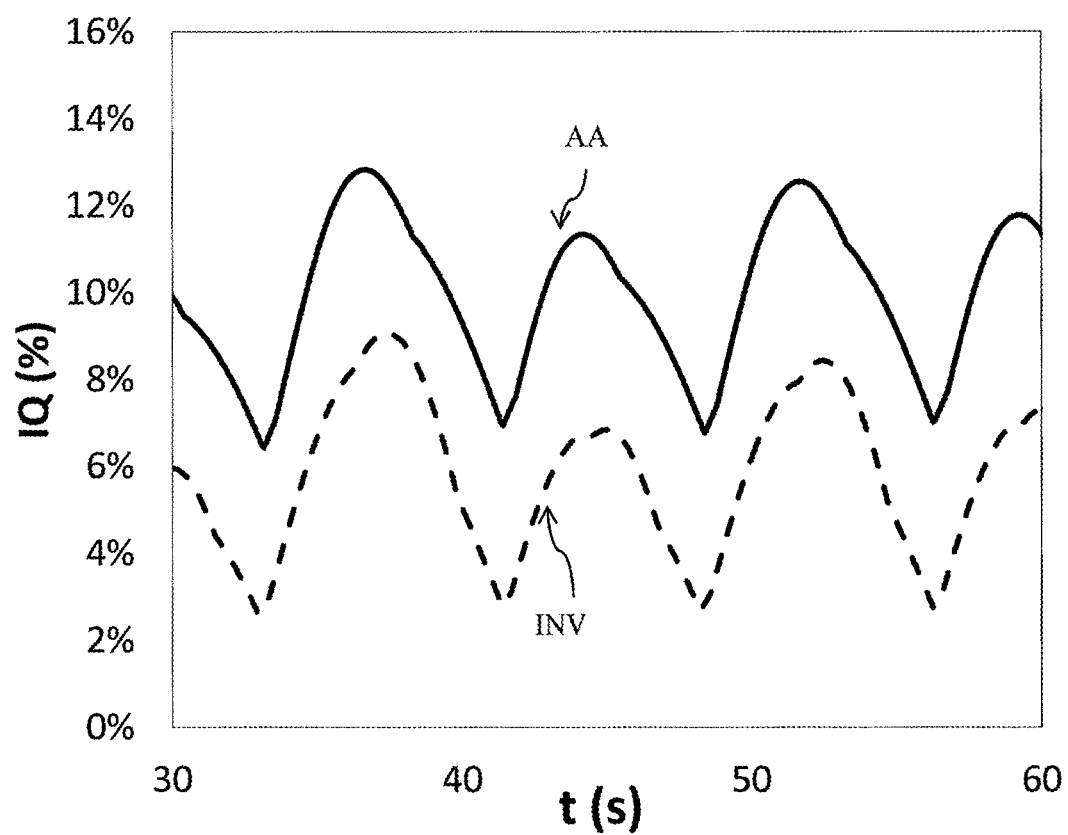
FIG. 9 is a comparative curve between a distributor tray according to the invention and a distributor tray according to the prior art.

FIG. 9 compares the evolution over time of the imbalance index IQ obtained with the two distributor trays. For the distributor tray according to the prior art French Patent Application No. 2,989,595 corresponding to US Published Application No. 2013/277,868, curve AA, the average imbalance index over a period of tray oscillation is 10%. With the distributor tray according to the invention, curve INV, the performance is better. Indeed, the average imbalance index is 5.8%. This example shows that the device according to the invention allows the distribution efficiency of the distributor tray to be improved in a floating environment.

The invention claimed is:

1. A distribution tray for a column providing at least one of heat and material exchange between gas and liquid comprising:
    a plurality of compartments including at least one liquid distribution compartment and at least one retention compartment, the compartments being disposed on the tray and including at least one wall having perforations allowing part of the liquid to flow between the compartments;
    the at least one distribution compartment including at least one means for providing passage of gas through the tray and at least one means for providing passage of liquid through the tray; and
    the at least one retention compartment located on a periphery of the tray with each retention compartment not allowing passage of liquid through the tray.

2. A tray as claimed in claim 1, wherein each retention compartment does not allow passage of the gas through the tray to another tray.

3. A tray as claimed in claim 1, wherein each compartment on the periphery of the tray comprises a retention compartment.

4. A tray as claimed in claim 2, wherein each compartment on the periphery of the tray comprises a retention compartment.

5. A tray as claimed in claim 1, wherein the means providing for passage of the gas comprises at least one chimney projecting upward from the upper face of the tray.

6. A tray as claimed in claim 1, wherein the means providing for passage of the gas comprises a chimney projecting from the upper face of the tray.

7. A tray as claimed in claim 3, wherein the means providing for passage of gas comprises a chimney projecting from an upper face of the tray.

8. A tray as claimed in claim 5, wherein a height of the at least one wall is greater than or equal to a height of the at least one chimney.

9. A tray as claimed in claim 6, wherein a height of the at least one wall is greater than or equal to a height of the at least one chimney.

10. A tray as claimed in claim 7, wherein a height of the at least one wall is greater than or equal to a height of the at least one chimney.

11. A tray as claimed in claim 1, wherein the perforations are arranged at a base of the at least one wall.

12. A tray as claimed in claim 2, wherein the perforations are arranged at a base of the at least one wall.

13. A tray as claimed in claim 3, wherein the perforations are arranged at a base of the at least one wall.

14. A tray as claimed in claim 8, wherein the perforations are arranged at a base of the at least one wall.

15. A tray as claimed in claim 1, wherein the tray comprises additional walls which are not parallel to the at least one wall.

16. A tray as claimed in claim 2, wherein the tray comprises additional walls which are not parallel to the at least one wall.

17. A tray as claimed in claim 3, wherein the tray comprises additional walls which are not parallel to the at least one wall.

18. A tray as claimed in claim 8, wherein the tray comprises additional walls which are not parallel to the at least one wall.

19. A tray as claimed in claim 15, wherein the walls include two series of walls with walls of each series being parallel to one another and not parallel to the walls of the other series.

20. A tray as claimed in claim 19, wherein the perforations on parallel walls of each series are not aligned.

21. A tray as claimed in claim 1, wherein length dimensions of the at least one distribution compartment range between 100 and 1000 mm.

22. A tray as claimed in claim 1, wherein a distance between a wall and a periphery of the at least one retention compartment ranges between 40 and 200 mm.

23. A tray as claimed in claim 1, wherein the at least one means for providing passage of gas through the tray comprises orifices and/or chimneys projecting from an upper face of the tray.

24. A tray as claimed in claim 1, wherein the tray comprises a secondary liquid distribution system projecting from a lower face of the tray for distributing the liquid coming from the means for providing passage of liquid.

25. A tray as claimed in claim 24, wherein the secondary distribution system comprises chimneys and/or deflectors.

26. At least one distributor tray in accordance with claim 1, comprising a packing contacted by the gas and the liquid.

27. A floating hydrocarbon recovery vessel comprising a distribution tray in accordance with claim 1 including at least one column.

28. A process of at least one of heat and material exchange between a gas and a liquid using a distribution tray having a column including a plurality of compartments including at least one liquid distribution compartment and at least one retention compartment, the compartments being disposed on the tray and including at least one wall having perforations allowing part of the liquid to flow between the compartments, the at least one distribution compartment including at least one means for providing passage of gas through the tray and at least one means for providing passage of liquid through the tray, the at least one retention compartment being located on a periphery of the tray and not allowing passage of liquid through the tray, comprising:

contacting the gas and the liquid using the distribution tray and performing one of gas treatment, $CO_2$ capture, distillation or air conversion.

* * * * *